US008610853B2

(12) United States Patent
Escuti

(10) Patent No.: US 8,610,853 B2
(45) Date of Patent: Dec. 17, 2013

(54) METHODS OF FABRICATING OPTICAL ELEMENTS ON SUBSTRATES AND RELATED DEVICES

(71) Applicant: North Carolina State University, Raleigh, NC (US)

(72) Inventor: Michael James Escuti, Cary, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 13/720,044

(22) Filed: Dec. 19, 2012

(65) Prior Publication Data

US 2013/0130156 A1 May 23, 2013

Related U.S. Application Data

(63) Continuation of application No. 12/596,168, filed as application No. PCT/US2008/004894 on Apr. 16, 2008, now Pat. No. 8,358,400.

(60) Provisional application No. 60/912,036, filed on Apr. 16, 2007.

(51) Int. Cl.
*G02F 1/1337* (2006.01)

(52) U.S. Cl.
USPC ............................ 349/124; 349/129; 349/193

(58) Field of Classification Search
None
See application file for complete search history.

(56) References Cited

U.S. PATENT DOCUMENTS

| 5,245,596 | A | 9/1993 | Gupta et al. |
| 5,626,991 | A | 5/1997 | Hugle |
| 5,793,733 | A * | 8/1998 | Takeda et al. ............ 369/112.02 |
| 6,226,110 | B1 | 5/2001 | Murray Clube |
| 7,692,759 | B2 | 4/2010 | Escuti et al. |
| 8,358,400 | B2 * | 1/2013 | Escuti ............................ 349/201 |
| 2002/0180912 | A1 | 12/2002 | Hsieh et al. |
| 2005/0140837 | A1 | 6/2005 | Crawford et al. |
| 2008/0278675 | A1 | 11/2008 | Escuti et al. |
| 2009/0009668 | A1 | 1/2009 | Tan et al. |

(Continued)

FOREIGN PATENT DOCUMENTS

| EP | 0525478 A2 | 2/1993 |
| EP | 0632311 A1 | 1/1995 |

(Continued)

OTHER PUBLICATIONS

Jones et al., P-209: *Evaluation of Projection Schemes for the Liquid Crystal Polarization Grating Operating on Unpolarized Light*; 2006 SID International Symposium, Society for Information Display; vol. XXXVI, pp. 1015-1017, May 24, 2005.

(Continued)

*Primary Examiner* — Mike Stahl
(74) *Attorney, Agent, or Firm* — Myers Bigel Sibley & Sajovec

(57) ABSTRACT

In a method of fabricating an optical element, an alignment surface is photolithographically patterned using a birefringent mask having a holographic pattern therein to create an alignment condition in the alignment surface based on the holographic pattern. A layer is formed on the alignment surface such that local optical axes of the layer are oriented according to the alignment condition in the alignment surface. For example, the layer may be a liquid crystal layer having respective molecular axes aligned according to the alignment condition. Related fabrication methods and polarization gratings are also discussed.

27 Claims, 5 Drawing Sheets

(56) References Cited

U.S. PATENT DOCUMENTS

2010/0171909 A1 7/2010 Handschy
2011/0188120 A1 8/2011 Tabirian et al.
2011/0262844 A1 10/2011 Tabirian et al.

FOREIGN PATENT DOCUMENTS

| JP | 10325955 A | 12/1998 |
|---|---|---|
| JP | 2002189124 A | 7/2002 |
| JP | 2002258053 A | 9/2002 |
| JP | 2004-341024 A | 12/2004 |
| WO | WO 2006/092758 A2 | 9/2006 |

OTHER PUBLICATIONS

Dozov et al., *Planar Degenerated Anchoring of Liquid Crystals Obtained by Surface Memory Passivation*, Applied Physics Letters, AIP, American Institute of Physics, vol. 77, No, 25; pp. 4124-4126, Dec. 18, 2000.
Zhan et al., *Polarization Properties of Inversely twisted Nematic Liquid-Crystal Gratings*; Applied Optics Society of America, vol. 37, No. 28, pp. 6755-6763, Oct. 1, 1998.
Zhang et al. *Application of Photoalignment Technology to Liquid-Crystal-on-Silicon Microdisplays*; Japanese Journal of Applied Physics, vol. 44, No. 6A, pp. 3983-3991, (2005).
Sieberle, et al., *Photoalignment of LCoS LCDs*, Journal of the Society for Information Display, vol. 10, No. 1, pp. 31-35, (2002).
Zhang et al., *Silicon Microdisplay with Photo-alignment*, IEEE, Optoelectronics, Proceedings of the Sixth Chinese Symposium, pp. 28-230, Sep. 12-14, 2003.
Escuti et al., *39.4: Polarization-Independent Switching with High Contrast from a Liquid Crystal Polarization Grating*; Society for Information Display, vol. XXXVII, pp. 1443-1446, May 24, 2005.
Oh et al., *P-167 FDTD and Elastic Continuum Analysis of the Liquid Crystal Polarization Grating*, g; Society for Information Display, vol. XXXVII, pp. 844-847, May 24, 2005.

Avrutsky, et al., *High-Efficiency Single-Order Waveguide Grating Coupler*, Optical Society of America, vol. 15., No. 24; pp. 1446-1448, Dec. 15, 1990.
Crawford et al., *Liquid-Crystal Diffraction Gratings Using Polarization Holography Alignment Techniques*, Journal of Applied Physics, vol. 98, No. 12, pp. 123102-1-123102-10; Dec. 27, 2005.
Oh et al., *L-6: Late-News Paper.' Achromatic Diffraction Using Reactive Mesogen Polarization Gratings*, Society for Information Display, vol. XXXVIII, pp. 1401-1404, May 20, 2007.
Lu et al., *Low Voltage and Wide-Viewing-Angle Twisted Nematic Liquid Crystal Displays by Optical Compensation*, Japanese Journal of Applied Physics, vol. 39, No. 5A, Part 2; pp. L412-L415, May 1, 2000.
International Search Report, PCT/US2008/004894 and Written Opinion; Oct. 23, 2008.
International Preliminary Report on Patentability; PCT/US2008/004894, Jul. 15, 2009.
First Office Action corresponding to Chinese Patent Application No. 2008-80012098,5; Date of Issue: Mar. 17, 2011; 16 pages.
First Office Action corresponding to Chinese Patent Application No. 2008-80012188.4; Date of Issue: Mar. 7, 2011; 8 pages.
Communication pursuant to Article 94(3) EPC corresponding to European Application No. 08 742 943.7 dated Apr. 8, 2011; 4 pages.
Communication pursuant to Article 94(3) EPC corresponding to European Application No. 08 742 945.2 dated Apr. 8, 2011; 4 pages.
European Communication Corresponding to European Application No. 11 178 032; Dated: Oct. 7, 2011; 10 pages.
European Summons to Attend Oral Proceedings Corresponding to European Application No. 08742945.2; Dated, Feb. 21, 2012; 4 pages.
Pancharatnam S., "Achromatic Combinations of Birefringent Plates—Part I.: An Achromatic Circular Polarizer", *Proceedings of The Indian Academy of Sciences, Section B, Biological Sciences*, Indian Academy of Sciences, Bangalore, IN, vol. 41, Mar. 1, 1955, pp. 130-136.
Chinese Office Action Corresponding to Chinese Patent Application No. 200880012154.5; Date of Issue: Mar. 28, 2012; 8 pages.
Japanese Office Action Corresponding to Japanese Patent Application No. 2010-504072;Issuing Date: Sep. 3, 2013; 2 Pages.

\* cited by examiner

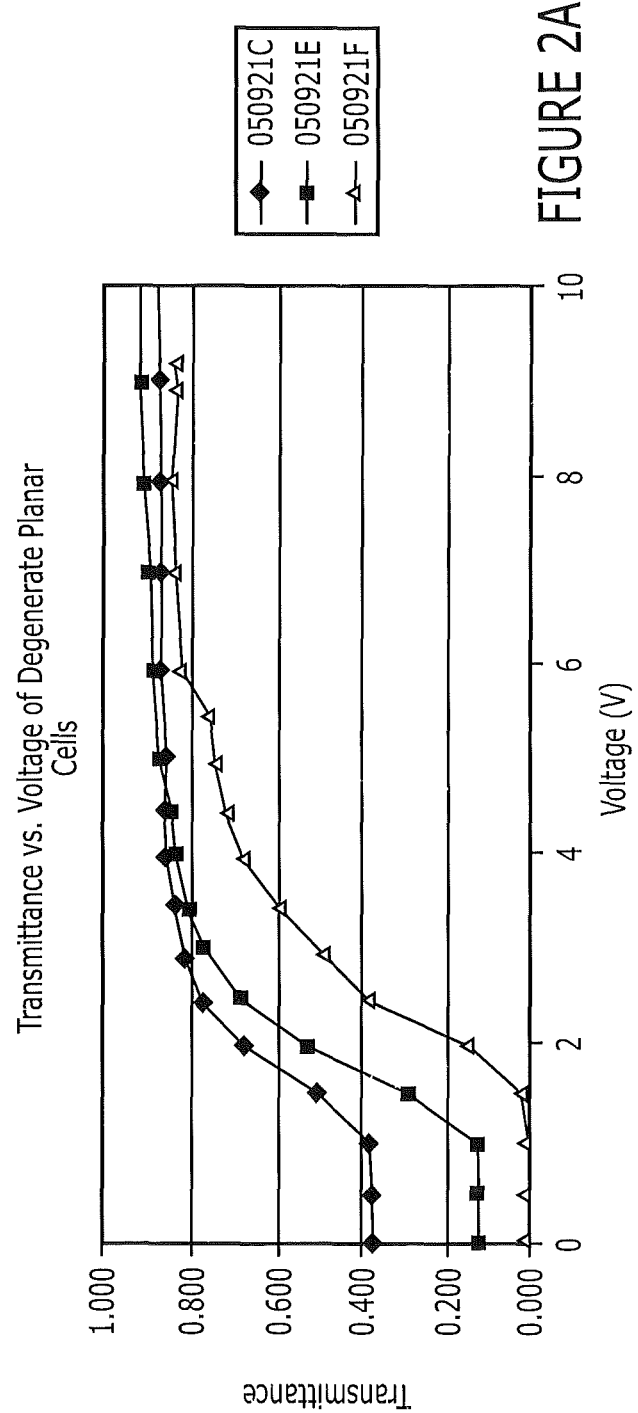

METHODS OF FABRICATING OPTICAL ELEMENTS ON SUBSTRATES AND RELATED DEVICES

CLAIM OF PRIORITY

The present application is a continuation of U.S. patent application Ser. No. 12/596,168, filed Oct. 16, 2009, which is a 35 U.S.C. §371 national phase application of PCT International Application No. PCT/US2008/004894, entitled "Methods of Fabricating Switchable Liquid Crystal Polarization Gratings on Reflective Substrates and Related Devices," having an international filing date of Apr. 16, 2008, which claims priority to U.S. Provisional Patent Application No. 60/912,036, entitled "Methods Of Fabricating Switchable Liquid Crystal Polarization Gratings On Reflective Substrates And Related Devices," filed Apr. 16, 2007, the disclosures of which are hereby incorporated herein by reference as set forth in their entireties.

FIELD OF THE INVENTION

The present invention relates to optical elements, and more particularly, to the fabrication of optical elements and related devices.

BACKGROUND OF THE INVENTION

Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties.

As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a predictable and controllable way. In many cases, the alignment surface may ensure a single domain through the LC device. In the absence of a treated alignment surface, the LC may have many domains and/or many discontinuities in orientation. In optical applications, these domains and discontinuities may cause scattering of light, leading to a degradation in the performance of the display.

Polarization gratings may be used to periodically affect the local polarization state of light traveling therethrough (as opposed to affecting the phase or amplitude as in some conventional gratings). For example, switchable liquid crystal polarization gratings (LCPGs) can be used to implement an intensity modulator that can operate on unpolarized light. While such polarization gratings have been fabricated to provide relatively high contrast for transmissive substrates, they may be difficult to implement on reflective substrates. In particular, switchable polarization grating designs may be difficult to create on reflective substrates, such as silicon (Si), aluminum (Al), gold (Au), and/or others, because the photo-alignment layers (which may be important to operation of the display) may be significantly corrupted by the reflection of the holographic ultraviolet (UV) beams used to pattern the photo-alignment layers from the reflective substrate. For example, when two orthogonally polarized holographic beams are incident on a reflective substrate, a strong reflection may occur to produce two additional beams in the opposite direction, which may result in interference and thus unwanted intensity variation in a direction normal to the substrate surface. Accordingly, the use of known fabrication techniques for transmissive substrates in the fabrication of reflective substrates may result in display devices having poor liquid crystal alignment, and thus, poor contrast.

SUMMARY OF THE INVENTION

According to some embodiments of the present invention, a method of fabricating a polarization grating includes creating a degenerate planar anchoring condition on a surface of a reflective substrate and forming a liquid crystal layer on the surface of the reflective substrate including the degenerate planar anchoring condition. For example, in some embodiments, an alignment layer may be formed on a substrate and may be patterned to create a periodic alignment condition in the alignment layer, and the degenerate planar anchoring condition may be created on the reflective substrate. The substrate may be assembled adjacent to the reflective substrate to define a gap between the patterned alignment layer and the surface of the reflective substrate, and the liquid crystal layer may be formed in the gap. In particular, the liquid crystal layer may be formed in the gap directly on the patterned alignment layer such that molecules of the liquid crystal layer are aligned according to the periodic alignment condition in the patterned alignment layer.

In some embodiments, the substrate may be a transmissive substrate, and the alignment layer may be a photo-alignment layer including photopolymerizable polymers therein. The alignment layer may be patterned by transmitting a laser beam through the transmissive substrate to pattern the photo-alignment layer to create the periodic alignment condition therein prior to assembling the transmissive and reflective substrates.

In other embodiments, the degenerate planar anchoring condition may provide a fixed tilt angle relative to the surface of the reflective substrate. For example, the fixed tilt angle may be less than about 5 degrees such that the degenerate planar anchoring condition does not substantially influence an alignment of molecules of the liquid crystal layer.

In some embodiments, the alignment layer may be photolithographically patterned using a holographically patterned polymerizable liquid crystal mask layer. For example, a polymerizable liquid crystal layer may be formed and holographically patterned using coherent light to define a mask layer including a holographic pattern therein. The photo-alignment layer may be photolithographically patterned using the mask layer to create the periodic alignment condition in the photo-alignment layer based on the holographic pattern in the mask layer.

In other embodiments, a light-absorbing film may be formed on the substrate prior to forming the alignment layer thereon. The light-absorbing film may be configured to absorb light in a wavelength range. The photo-alignment layer may be patterned using coherent light within the wavelength range to create the periodic alignment condition in the photo-alignment layer.

According to other embodiments of the present invention, a switchable liquid crystal polarization grating device includes a reflective substrate and a liquid crystal layer thereon. The reflective substrate includes a degenerate planar anchoring condition on a surface thereof, and the liquid crystal layer is on the surface of the reflective substrate including the degenerate planar anchoring condition. The polarization grating device may further include a transmissive substrate, and an alignment layer on the transmissive substrate. The alignment layer may include a periodic alignment condition therein, and may be on the liquid crystal layer opposite the surface of the reflective substrate including the degenerate planar anchoring condition. For example, in some embodiments, the liquid crystal layer may be directly on the alignment layer, and an alignment of molecules of the liquid crystal layer may correspond to the periodic alignment condition of the alignment layer.

In some embodiments, the liquid crystal layer may be directly on the surface of the reflective substrate including the degenerate planar anchoring condition. The degenerate planar anchoring condition may provide a fixed tilt angle relative to the surface of the reflective substrate. For example, the fixed tilt angle may be less than about 5 degrees such that the degenerate planar anchoring condition does not substantially influence an alignment of molecules of the liquid crystal layer.

According to further embodiments of the present invention, a method of fabricating a switchable liquid crystal polarization grating includes forming a light-absorbing film on a reflective substrate. The light-absorbing film is configured to absorb light, such as light from a holographic recording beam, in a particular wavelength range. A photo-alignment layer is formed on the light-absorbing film, and is patterned using coherent light within the particular wavelength range configured to be absorbed by the light-absorbing film to create a periodic alignment condition in the photo-alignment layer. A liquid crystal layer is formed on the patterned photo-alignment layer such that molecules of the liquid crystal layer are aligned according to the periodic alignment condition in the photo-alignment layer.

In some embodiments, a second photo-alignment layer may be formed on a transparent substrate, and the transparent substrate may be assembled adjacent the reflective substrate to define a gap between the first and second photo-alignment layers. As such, the first and second photo-alignment layers may be patterned using a laser beam to create respective periodic alignment conditions therein after assembling the transparent and reflective substrates, and the liquid crystal layer may be formed in the gap after patterning the first and second photo-alignment layers.

In other embodiments, the liquid crystal layer may be formed in the gap directly on the first and second photo-alignment layers such that the molecules of the liquid crystal layer are aligned according to the respective periodic alignment conditions of the first and second photo-alignment layers.

In some embodiments, the light absorbing film may be an ultraviolet (UV) light-absorbing film configured to absorb light in an ultraviolet wavelength range, and the coherent light may be an ultraviolet (UV) laser beam within the ultraviolet wavelength range. As such, the first and second photo-alignment layers may be patterned by transmitting the ultraviolet (UV) laser beam through the transparent substrate to simultaneously pattern the first and second photo-alignment layers to create the respective periodic alignment conditions therein.

In other embodiments, the gap between the first and second photo-alignment layers may be about a half-wave retardation thickness for light within an operational wavelength range of the polarization grating device.

According to still other embodiments of the present invention, a switchable liquid crystal polarization grating device includes a reflective substrate, a light-absorbing film configured to absorb light in a wavelength range on the reflective substrate, a photo-alignment layer including a periodic alignment condition therein on the light-absorbing film, and a liquid crystal layer on the photo-alignment layer. An alignment of molecules of the liquid crystal layer corresponds to the periodic alignment condition of the photo-alignment layer. The device may further include a transparent substrate, and a second photo-alignment layer including a second periodic alignment condition therein on the transparent substrate. The second photo-alignment layer may be on the liquid crystal layer opposite the first photo-alignment layer.

In some embodiments, the liquid crystal layer may be directly on the first and second photo-alignment layers, and the first and second periodic alignment conditions may be a same periodic alignment condition. The alignment of the molecules of the liquid crystal layer may correspond to the same periodic alignment condition of the first and second photo-alignment layers.

In other embodiments, the light absorbing film may be an ultraviolet (UV) light-absorbing film configured to absorb light in an ultraviolet wavelength range. Also, a distance between the first and second photo-alignment layers may be about a half-wave retardation thickness for light within an operational wavelength range of the polarization grating device.

According to still other embodiments of the present invention, a method of fabricating a switchable liquid crystal polarization grating includes fabricating a mask layer including a holographic pattern therein, forming a photo-alignment layer on a substrate, and photolithographically patterning the photo-alignment layer using the mask layer to create a periodic alignment condition in the photo-alignment layer based on the holographic pattern. A liquid crystal layer is formed on the photo-alignment layer and is aligned according to the periodic alignment condition in the photo-alignment layer.

In some embodiments, the mask layer may be a polymerizable liquid crystal polarization grating. The mask layer may be fabricated by forming a polymerizable liquid crystal layer, and holographically patterning the polymerizable liquid crystal layer using coherent light to define the mask layer including the holographic pattern therein. Also, a chiral dopant may be added to the polymerizable liquid crystal layer prior to holographically patterning the polymerizable liquid crystal layer.

In other embodiments, the photo-alignment layer may be photolithographically patterned by transmitting ultraviolet (UV) light through the mask layer including the holographic pattern therein such that a spatially-varying near-field output of the mask layer may be transferred to the photo-alignment layer to create the periodic alignment condition in the photo-alignment layer. The UV light may be weakly coherent, and the mask layer may have a thickness configured to provide half-wave retardation for a wavelength range of the ultraviolet light.

In some embodiments, the substrate may be a reflective substrate. The method may further include forming a second photo-alignment layer on a transmissive substrate, and photolithographically patterning the second photo-alignment layer using the mask layer to create the periodic alignment condition in the second photo-alignment layer based on the holographic pattern. The transmissive substrate may be assembled adjacent to the reflective substrate to define a gap between the first and second photo-alignment layers. The gap between the first and second photo-alignment layers may be about a half-wave retardation thickness for an ultraviolet wavelength range. The liquid crystal layer may be formed in the gap directly on the first and second photo-alignment layers such that the molecules of the liquid crystal layer are aligned according to the periodic alignment condition of the first and second photo-alignment layers.

Other devices and/or methods of fabrication according to some embodiments will become apparent to one with skill in the art upon review of the following drawings and detailed description. It is intended that all such additional methods and/or devices be included within this description, be within the scope of the invention, and be protected by the accompanying claims.

BRIEF DESCRIPTION OF THE DRAWINGS

FIGS. 2A-2D are graphs illustrating examples of transmittance characteristics of substrates including degenerate planar anchoring conditions according to some embodiments of the present invention.

DETAILED DESCRIPTION OF EMBODIMENTS OF THE INVENTION

Figure 1A:
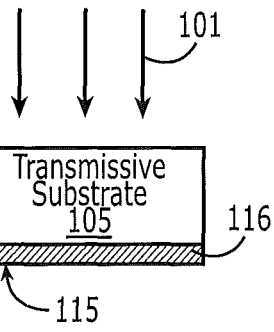
FIGS. 1A-1D are cross-sectional and perspective views illustrating methods of fabricating polarization gratings on reflective substrates and devices so fabricated according to some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It will be understood by those having skill in the art that, as used herein, a "transmissive" or "transparent" substrate may allow at least some of the incident light to pass therethrough. Accordingly, the transparent substrate may be a glass substrate in some embodiments. In contrast, a "reflective" substrate as described herein may reflect at least some of the incident light. Also, "polymerizable liquid crystals" may refer to relatively low-molecular weight liquid crystal materials that can be polymerized, and may also be described herein as "reactive mesogens". In contrast, "non-reactive liquid crystals" may refer to relatively low-molecular weight liquid crystal materials that may not be polymerized.

Embodiments of the present invention are described herein with reference to liquid crystal (LC) materials and alignment layers. As used herein, the liquid crystals can have a nematic phase, a chiral nematic phase, a smectic phase, a ferroelectric phase, and/or other phase(s). In addition, a number of photopolymerizable polymers may be used for the alignment layers. In addition to being photopolymerizable, these materials may be inert with respect to the LC, should provide stable alignment over a range of operating temperatures of the LC device (e.g., from about −50° C. to about 100° C.), and should be compatible with manufacturing methods described herein. Some examples of photopolymerizable polymers include polyimides (e.g., AL 1254 commercially available from JSR Micro, Inc (Sunnyvale, Calif.)), Nissan RN-1199 available from Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," Jpn. J. Appl. Phys., Vol. 31 (1992), pp. 2155-2164). Another example of a photopolymerizable polymer is Staralign™, commercially available from Vantico Inc. (Los Angeles, Calif.). Further examples include chalcone-epoxy materials, such as those disclosed by Dong Hoon Choi and co-workers in "Photoalignment of Low-molecular Mass Nematic Liquid Crystals on Photochemically Bifunctional Chalcone-epoxy Film by Irradiation of a Linearly Polarized UV," Bull. Korean Chem. Soc., Vol. 23, No. 4 587 (2002), and coumarin side chain polyimides, such as those disclosed by M. Ree and co-workers in "Alignment behavior of liquid-crystals on thin films of photosensitive polymers—Effects of photoreactive group and UV-exposure," Synth. Met., Vol. 117(1-3), pp. 273-5 (2001) (with these materials, the LC aligns nearly perpendicularly to the direction of polarization). Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials. Additional structures and/or methods for use with some embodiments of the present invention are discussed in PCT Publication No. WO 2006/092758 to Escuti, et al., the disclosure of which is incorporated by reference herein in its entirety.

Some embodiments of the present invention provide methods for producing high-quality switchable liquid crystal polarization gratings on reflective substrates and devices so fabricated. More particularly, some embodiments of the present invention provide methods to achieve this polarization grating structure to achieve high contrast switches on reflective structures, for example, for use in microdisplay substrates including Liquid Crystal on Silicon (LCOS). The use of reflective substrates for microdisplays may be advantageous in generating higher quality images because all of the drive electronics can be buried beneath the reflective pixel structure. Accordingly, the ability to create a switchable liquid crystal grating on a reflective substrate may be important to its wide implementation as a projection display technology, since it may enable a higher quality image as well as a physically smaller package.

FIGS. 1A-1D illustrate methods of fabricating a polarization grating on a reflective substrate according to some embodiments of the present invention and devices so fabricated. More particularly, as shown in FIGS. 1A-1D, a hybrid-alignment technique may be used to create the polarization grating cell. Referring now to FIG. 1A, an alignment layer 115 is formed on a transmissive substrate 105 that is transmissive to light. The alignment layer 115 on the transmissive or transparent substrate 105 is patterned so as to provide a periodic alignment condition 116 in the alignment layer 115. For example, the alignment layer 115 may be a photo-alignment layer including photopolymerizable polymers therein, and the periodic alignment condition 116 may be provided using orthogonal circular polarized UV laser beams 101 to pattern the photo-alignment layer 115 through the substrate 105.

Figure 1B:
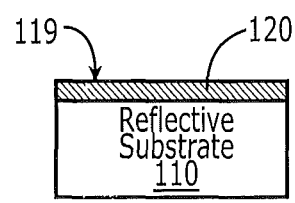

A degenerate planar alignment or anchoring condition 120 is created on the surface 119 of the reflective substrate 110 as shown in FIG. 1B. For example, the degenerate planar alignment condition 120 may have a fixed tilt angle and an arbitrary azimuth angle. The degenerate planar alignment condition 120 can be created using monolayers, amorphous polymer layers, clean oxide silicon, metal surfaces, and/or other methods. In some embodiments, the fixed tilt angle may be substantially planar, i.e., less than about 5 degrees, relative to the surface of the reflective substrate 110 such that no preferred alignment direction is created. However, other fixed tilt angles may also be used at the degenerate planar anchoring interface. Degenerate planar anchoring is further described by I. Dozov and D. N. Stoenescu et al. in "Planar degenerated anchoring of liquid crystals obtained by surface memory passivation", Applied Physics Letters 77(25):4124-4126 (2000), the disclosure of which is incorporated by reference herein.

Figure 1C:
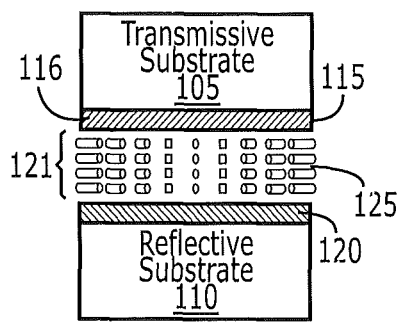
Figure 1D:
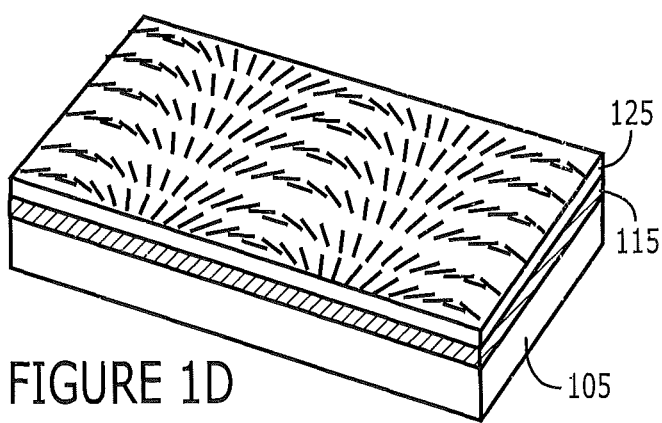

The two substrates 105 and 110 are assembled together closely spaced apart to provide a cell gap 121 therebetween and filled with a liquid crystal material, as shown in FIG. 1C, to form a liquid crystal layer 125 therebetween. The periodic alignment condition 116 in the photo-alignment layer 115 induces the molecules of the liquid crystal layer 125 to align according to the periodic alignment condition 116 in the photo-alignment layer 115, as shown in FIG. 1D. However, the degenerate planar alignment condition 120 does not substantially influence the orientation of the molecules of the liquid crystal layer 125. The cell gap 121 may be relatively small (i.e., about 1-3 micrometers) to provide good liquid crystal alignment on the reflective substrates. Accordingly, a polarization grating may be fabricated without the need to holographically pattern the reflective substrate 110 (i.e., without the need to expose the hologram on the reflective substrate 110), thereby reducing and/or preventing corruption of the photo-alignment layer 115 due to reflection of the holographic beams from the reflective substrate 110. Thus, a polarization grating may be fabricated on a reflective substrate and potentially with a non-in-plane liquid crystal director. In addition, such methods of fabricating polarization gratings may be used to combine a patterned transparent structure with standard silicon substrates (for example, for LCOS displays) with minimal modification.

Figure 2B:
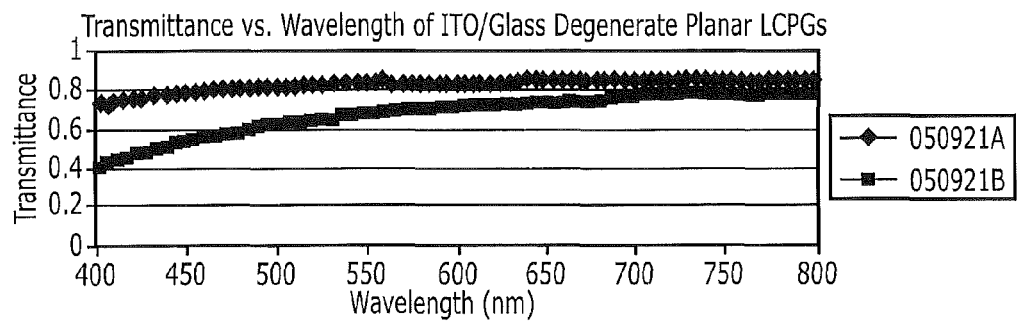
Figure 2C:
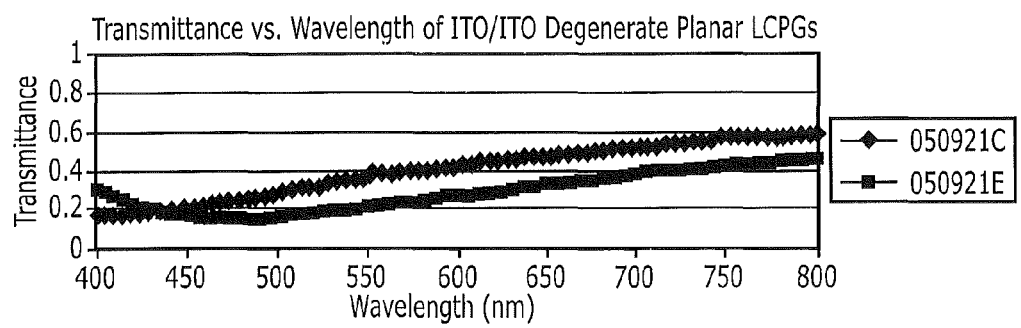
Figure 2D:
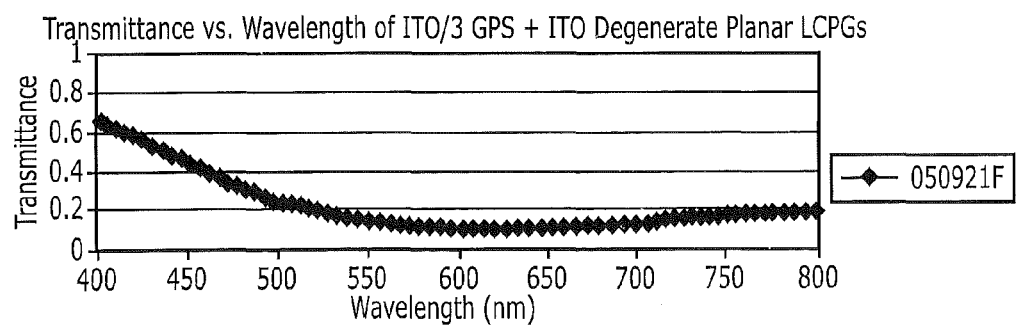

Examples of transmittance characteristics of substrates including degenerate planar anchoring conditions according to some embodiments of the present invention are further illustrated in FIGS. 2A-2D. In particular, FIGS. 2A-2D illustrate transmittance characteristics for five different degenerate planar liquid crystal polarization gratings (LCPGs) samples 050921A, 050921B, 050921C, 050921E, and 050921F in accordance with some embodiments of the present invention. For instance, FIG. 2A illustrates transmittance vs. voltage characteristics for the 050921C, 050921E, and 050921F samples. Sample 050921C is a structure where a liquid crystal layer is provided between an indium-tin-oxide (ITO)-coated glass substrate including a degenerate planar anchoring condition and an ITO-coated glass substrate including a linearly photopolymerised polymer (LPP) as an alignment layer. Sample 050921E is a similar structure including a liquid crystal layer between an ITO-coated glass substrate including a degenerate planar anchoring condition and an LPP/ITO-coated glass substrate, where the ITO glass was cleaned using methanol. Sample 050921F is a structure including a liquid crystal layer between an LPP/ITO-coated glass substrate and a (3-Glycidyl-oxypropyl) trimethoxysilane (3GPS)/ITO-coated glass substrate having a degenerate planar anchoring condition. FIG. 2B illustrates transmittance vs. wavelength characteristics for the 050921A, and 050921B samples. Samples 050921A and 050921B include a liquid crystal layer between a bare glass substrate having a degenerate planar anchoring condition and an LPP/ITO-coated glass substrate. FIG. 2C illustrates transmittance vs. wavelength characteristics for the 050921C, and 050921E samples, and FIG. 2D illustrates transmittance vs. wavelength characteristics for the 050921F sample.

Figure 3A:
FIGS. 3A-3E are cross-sectional views illustrating methods of fabricating polarization gratings on reflective substrates and devices so fabricated according to other embodiments of the present invention.
Figure 3B:
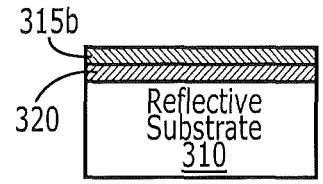
Figure 3C:
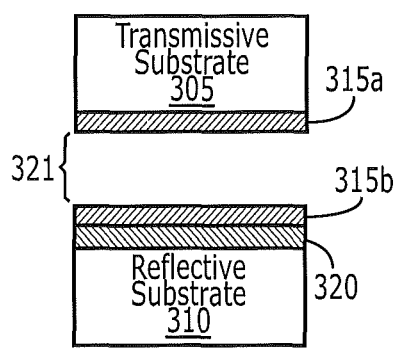
Figure 3D:
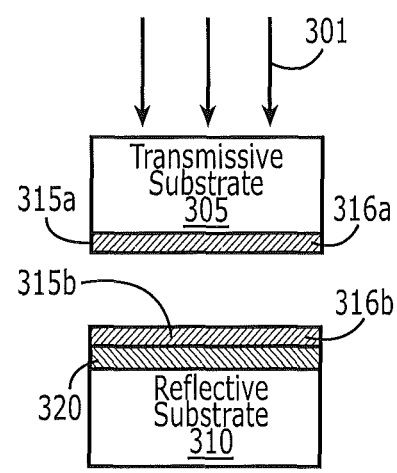
Figure 3E:
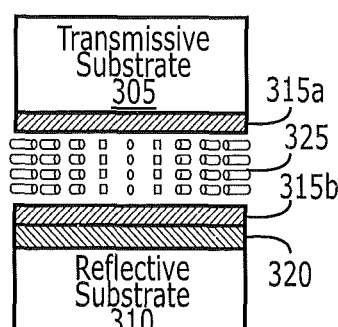

FIGS. 3A-3E illustrate methods of fabricating a polarization grating on a reflective substrate according to other embodiments of the present invention and devices so fabricated. Referring now to FIG. 3A, an ultraviolet (UV) light-absorbing thin film 320 is formed on the reflective substrate 310. The UV light-absorbing thin film 320 may be transparent to visible light, but may be configured to absorb light within a UV wavelength range, for example, less than about 380 nm. As shown in FIG. 3B, a photo-alignment layer 315b is formed on the UV-absorbing film. A photo-alignment layer 315a is also formed on a transmissive or transparent substrate 305. The reflective substrate 310 and the transparent substrate 305 are assembled together in a closely spaced apart relation to provide a cell gap 321 therebetween, as shown in FIG. 3C. The cell gap 321 may be substantially uniform, and may be about the half-wave retardation thickness for light within the operational wavelength range of the polarization grating, for example, about 2 micrometers (μm). In other words, the cell gap 321 may be configured to provide half-wave retardation of the light used in operation of the polarization grating. After assembling the transparent substrate 305 and the reflective substrate 310, the photo-alignment layers 315a and 315b are patterned to provide respective periodic alignment conditions 316a and 316b in the photo-alignment layers 315a and 315b, as shown in FIG. 3D. For example, the photo-alignment layers 315a and 315b may be exposed using UV laser beams 301. In some embodiments, the photo-alignment layers 315a and 315b may be patterned such that both layers 315a and 315b have the same periodic alignment condition. Accordingly, the UV-absorbing thin film 320 on the reflective substrate 310 reduces and/or removes reflection of the hologram recording beams the reflective substrate 310, thereby reducing or avoiding detrimental effects on the photo-alignment layers 315a and/or 315b. After the patterning process, the gap 321 between the reflective substrate 310 and the transparent substrate 305 is filled with a liquid crystal material, as shown in FIG. 3E, to form a liquid crystal layer 325 therebetween. The molecules of the liquid crystal layer 325 are aligned based on the alignment conditions 316a and 316b in the photo-alignment layers 315a and 315b to thereby provide a well-aligned planar polarization grating. Accordingly, some embodiments of the present invention may be easily integrated into current fabrication processes with minimal changes to achieve a desired liquid crystal configuration.

Figure 4A:
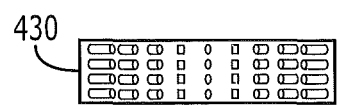
FIGS. 4A-4C are cross-sectional views illustrating methods of fabricating polarization gratings on reflective substrates and devices so fabricated according to still other embodiments of the present invention.
Figure 4B:
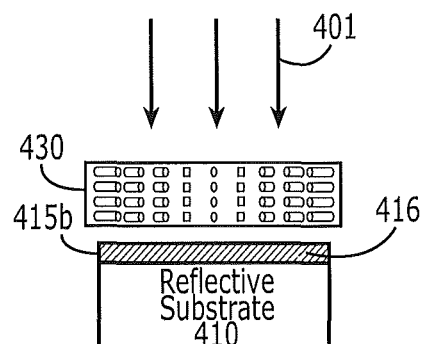
Figure 4C:
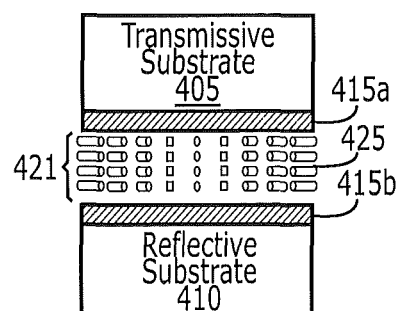

FIGS. 4A-4C illustrate methods of fabricating a polarization grating on a reflective substrate and devices so fabricated according to other embodiments of the present invention. More particularly, FIGS. 4A-4C illustrate a "mask-transfer" technique where a holographic pattern is captured in an anisotropic "mask" that is subsequently used with incoherent light to directly pattern the reflective substrate. Referring now to FIG. 4A, a polymerizable liquid crystal polarization grating 430, as also referred to herein as a reactive mesogen (RM) grating, is fabricated. The polymerizable liquid crystal polarization grating 430 may be fabricated using a one-glass substrate technique, as is well known in the art. The polymer polarization grating 430 may have a half-wave retardation at a chosen UV wavelength. For example, in some embodiments, the polymer polarization grating 430 may be transparent and birefringent. However, in other embodiments, the polymer polarization grating 430 may be partially absorbing and dichroic. As such, the polymer polarization grating 430 may be used as an anisotropic "mask" for patterning a photo-alignment layer on a substrate. In some embodiments, the mask may be formed along with a chiral dopant. Such chiral dopants are further discussed in PCT Publication No. WO 2006/092758 to Escuti, et al., the disclosure of which is incorporated by reference herein in its entirety.

More particularly, as shown in FIG. 4B, the polymer polarization grating 430 is placed in close proximity to a target substrate 410 including a photo-alignment layer 415b thereon, and is illuminated with UV light 401. The UV light 401 may be unpolarized and/or weakly coherent to reduce and/or minimize the intensity of any reflected light. As such, the spatially varying near-field output of the "mask" is directly transferred to the photo-alignment layer 415b on the target substrate 410 using photolithography techniques to create a periodic alignment condition 416 therein. Although illustrated in FIG. 4B as a reflective substrate, the target substrate 410 may also be a transparent or transmissive substrate. Thus, the procedure of FIG. 4B may be similarly performed for a transparent substrate 405 including a photo-alignment layer 415a thereon, and the transparent and reflective substrates 405 and 410 may be assembled and filled with a liquid crystal material 425 in the gap 421 therebetween as shown in FIG. 4C. As described above, the molecules of the liquid crystal layer 425 are aligned based on the alignment conditions in the photo-alignment layers 415a and/or 415b to thereby provide a well-aligned planar polarization grating. Accordingly, a desired liquid crystal configuration may be achieved in a manner that can avoid using holography on the target substrate. Rather, holography may be used to create an anisotropic mask, which is subsequently used to photolithographically pattern the target substrate. As such, some embodiments of the present invention may be used to more quickly and easily achieve higher yields from larger silicon wafer sizes.

Thus, according to some embodiments of the present invention, a liquid crystal modulator may be created on reflective substrates with the ability to modulate unpolarized light. Accordingly, some embodiments of the present invention may be particularly advantageous for portable projection displays, consumer TV sets, real-time holography, and/or other devices where a spatial-light-modulator may be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, although not illustrated, the substrates described herein may include one or more electrodes on surfaces thereof, for instance, provided by a transparent indium-tin-oxide (ITO) coating on the substrates. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:
1. A method of fabricating an optical element, the method comprising:
photolithographically patterning an alignment surface using a birefringent mask having a holographic pattern therein to create an alignment condition in the alignment surface based on the holographic pattern; and forming a layer on the alignment surface such that local optical axes of the layer are oriented according to the alignment condition in the alignment surface.

2. The method of claim 1, wherein the holographic pattern comprises a spatially-varying optical axis.

3. The method of claim 1, wherein photolithographically patterning the alignment surface comprises:
transmitting light through the mask to create the alignment condition in the alignment surface according to the holographic pattern in the mask, wherein the light is not fully coherent.

4. The method of claim 3, wherein the light is partially coherent and/or partially polarized.

5. The method of claim 3, wherein the light is incoherent and/or unpolarized.

6. The method of claim 3, wherein the mask is configured to provide half-wave retardation for a wavelength range of the light.

7. The method of claim 1, wherein the alignment condition is spatially varying along the alignment surface.

8. The method of claim 7, wherein the alignment condition is periodic.

9. The method of claim 1, wherein the alignment surface comprises a photo-alignment layer including photopolymerizable polymers therein.

10. The method of claim 9, wherein photolithographically patterning the alignment surface comprises:
transmitting partially coherent or incoherent ultraviolet light through the mask including the holographic pattern therein such that a spatially-varying near-field output of the mask is transferred to the photo-alignment layer to create the alignment condition in the photo-alignment layer.

11. The method of claim 1, further comprising:
holographically patterning an alignment layer using coherent light to define a pattern therein; and
forming a birefringent layer on the alignment layer such that local optical axes of the birefringent layer are oriented according to the pattern to define the birefringent mask having the holographic pattern therein.

12. The method of claim 11, wherein the birefringent layer comprises a liquid crystal layer.

13. The method of claim 12, wherein the liquid crystal layer is polymerizable, and further comprising:
polymerizing the liquid crystal layer to define the birefringent mask having the holographic pattern therein.

14. The method of claim 13, further comprising:
adding a chiral dopant to the liquid crystal layer prior to polymerizing the liquid crystal layer.

15. The method of claim 1, wherein the layer comprises a liquid crystal layer.

16. The method of claim 15, wherein the liquid crystal layer is non-reactive.

17. The method of claim 1, further comprising:
forming the alignment surface on a substantially transparent substrate prior to photolithographically patterning the alignment surface.

18. The method of claim 1, further comprising:
forming the alignment surface on a reflective substrate prior to photolithographically patterning the alignment surface.

19. The method of claim 18, wherein the alignment surface is a first alignment surface, and further comprising:
forming a second alignment surface on a transmissive substrate;
photolithographically patterning the second alignment surface using the birefringent mask to create the alignment condition in the second alignment surface based on the holographic pattern; and
assembling the reflective substrate adjacent to the transmissive substrate to define a gap between the first and second alignment surfaces, wherein forming the layer comprises forming a liquid crystal layer in the gap directly on the first and second alignment surfaces such that molecules of the liquid crystal layer are aligned according to the alignment condition of the first and second alignment surfaces.

20. The method of claim 19, wherein the gap between the first and second alignment surfaces is about a half-wave retardation thickness for light within an ultraviolet wavelength range.

21. A method of fabricating an optical element, the method comprising:
fabricating a birefringent mask including a holographic pattern therein;
forming a photo-alignment layer on a substrate;
transmitting light that is not fully coherent through the birefringent mask to create an alignment condition in the photo-alignment layer according to the holographic pattern in the mask; and
forming a liquid crystal layer on the photo-alignment layer such that molecules of the liquid crystal layer are oriented according to the alignment condition in the photo-alignment layer.

22. The method of claim 21, wherein the holographic pattern provides a spatially-varying optical output.

23. The method of claim 22, wherein the alignment condition is spatially varying along the alignment surface.

24. The method of claim 22, wherein the alignment condition is periodic.

25. The method of claim 21, wherein the light is at most partially coherent and/or partially polarized.

26. The method of claim 25, wherein transmitting the light through the mask comprises:
transmitting partially coherent or incoherent ultraviolet light through the mask such that a spatially-varying near-field output of the mask is transferred to the photo-alignment layer to create the alignment condition in the photo-alignment layer.

27. The method of claim 21, wherein fabricating the birefringent mask comprises:
holographically patterning an alignment layer using coherent light to define the holographic pattern therein;
forming a polymerizable liquid crystal layer on the alignment layer such that molecules of the polymerizable liquid crystal layer are oriented according to the holographic pattern; and
polymerizing the polymerizable liquid crystal liquid crystal layer to define the birefringent mask including the holographic pattern therein.

* * * * *